L. MORGAN.
Stave for Smut-Machine Cases.
No. 8,879. Reissued Sept. 2, 1879.
FIG. II.
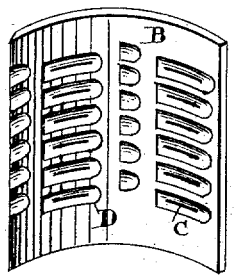
FIG I
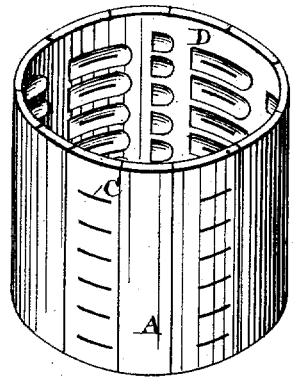
FIG. III.
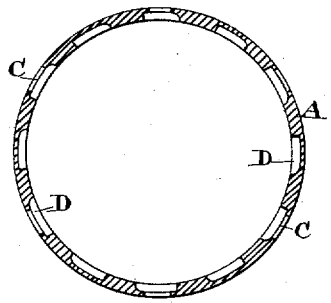
ATTEST:
M. Goodman
Alex. Scott
INVENTOR
Lyman Morgan
by F. W. Ritter Jr.
associate atty
N. PETERS, PHOTO-LITHOGRAPHER, WASHINGTON, D. C.

UNITED STATES PATENT OFFICE.

LYMAN MORGAN, OF OZAUKEE, WISCONSIN.

IMPROVEMENT IN STAVES FOR SMUT-MACHINE CASES.

Specification forming part of Letters Patent No. 164,198, dated June 8, 1875; Reissue No. 8,879, dated September 2, 1879; application filed June 17, 1879.

DIVISION B.

*To all whom it may concern:*

Be it known that I, LYMAN MORGAN, of the town and county of Ozaukee, State of Wisconsin, have invented certain new and useful Improvements in Smut-Mills; and I do hereby declare the following to be a full, clear, and exact description thereof, reference being had to the accompanying drawings.

In smut-machine cases it is desirable to have a smooth, even surface on the outer or convex side, to avoid the sticking of the dust and refuse, and the consequent clogging of the slots through which it passes. It is also desirable to have an uneven surface on the inner or concave side, which, at the same time, is free from any roughness that might injure the grains. To this end, therefore, have I made my present invention—viz., a stave for smut-machine cases having oblong indentations and chilled slots, as will hereinafter be more fully described.

In the drawings, Figure 1 is a perspective view of a smut-machine case made up of my improved staves. Fig. 2 is a perspective view of two of the staves put together to make a section of a smut-machine case, and Fig. 3 is a horizontal section of a smut-machine case.

A is the case; B, the staves; C, the slots, which are made and chilled by a process of casting described and claimed in Division A of this reissue; and D, the indentations. The indentations D are preferably rounded in cross-section, as shown in the drawings.

The grain, as it is struck by the beaters, is thrown out into the oblong indentations D, from which it rebounds to the beater, and in being thrown back and forth is scoured, the peculiar shape of the indentations obviating any tendency of the grain to wedge, grind, or be cracked, and permitting it to turn end over end, so that its entire surface is freed from all impurities, which are by the usual air-blast blown out through the slots C. The chilled surfaces of the slots will strongly resist frictional wear, and coming flush with the outer surface of the staves will maintain their original size until the stave is worn clear through from the inside.

The outer surface of the stave is perfectly smooth, and without projections for lodging the refuse so as to clog up the slots.

In smut-machine cases as formerly made, the indentations were wedge or V shaped, and only imperfectly did their work, often grinding and cracking the grain and becoming clogged by an accumulation of refuse.

What I claim is—

1. A stave for smut-machine cases having indentations and slots provided with chilled margins, as and for the purpose set forth.

2. A smut-machine stave having oblong indentations of rounded cross-sectional form, terminating in slots with chilled margins or boundaries, substantially as specified.

In testimony that I claim the foregoing as my own I affix my signature in presence of two witnesses.

LYMAN MORGAN.

In presence of—
E. H. BOTTUM,
S. S. STOUT.